June 2, 1964 W. E. HERRMANN 3,135,484
CONTROL SYSTEM FOR ANNULAR WING AIRCRAFT
Filed Nov. 18, 1959 3 Sheets-Sheet 1
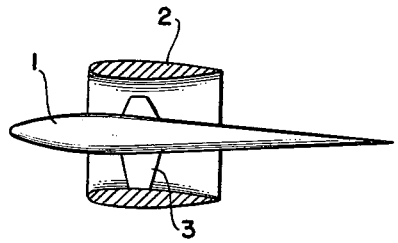
Fig.1
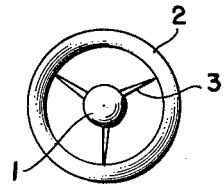
Fig.1A
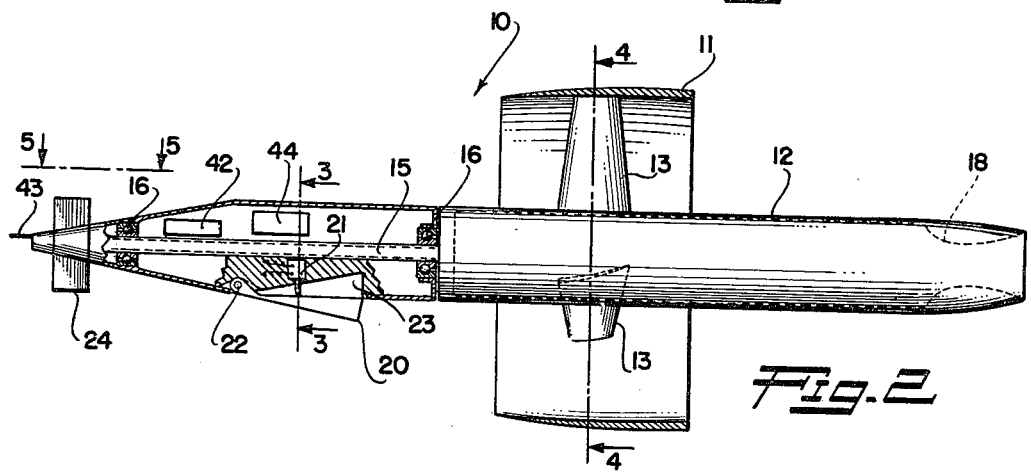
Fig.2
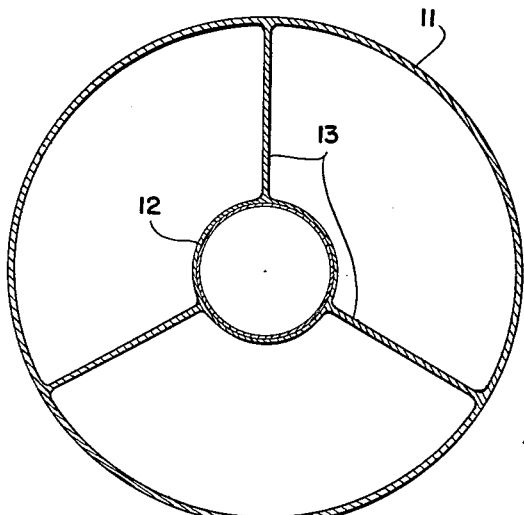
Fig.3
Fig.4
INVENTOR.
WERNER E. HERRMANN
BY
George C. Sullivan
Agent June 2, 1964   W. E. HERRMANN   3,135,484
CONTROL SYSTEM FOR ANNULAR WING AIRCRAFT
Filed Nov. 18, 1959   3 Sheets-Sheet 2
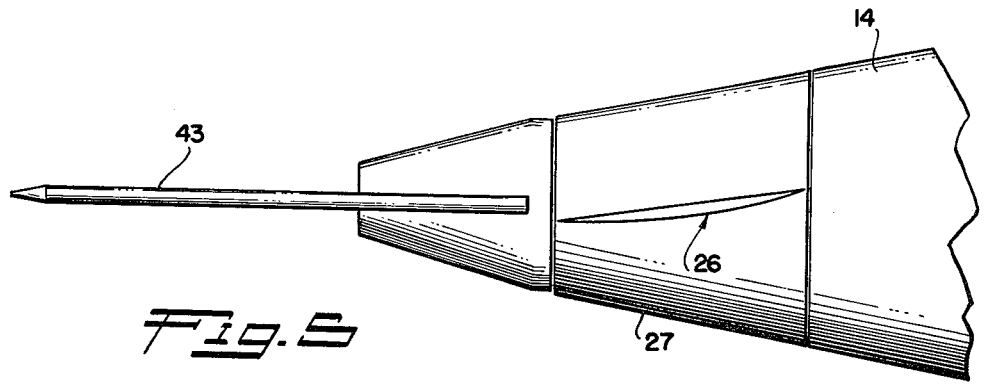
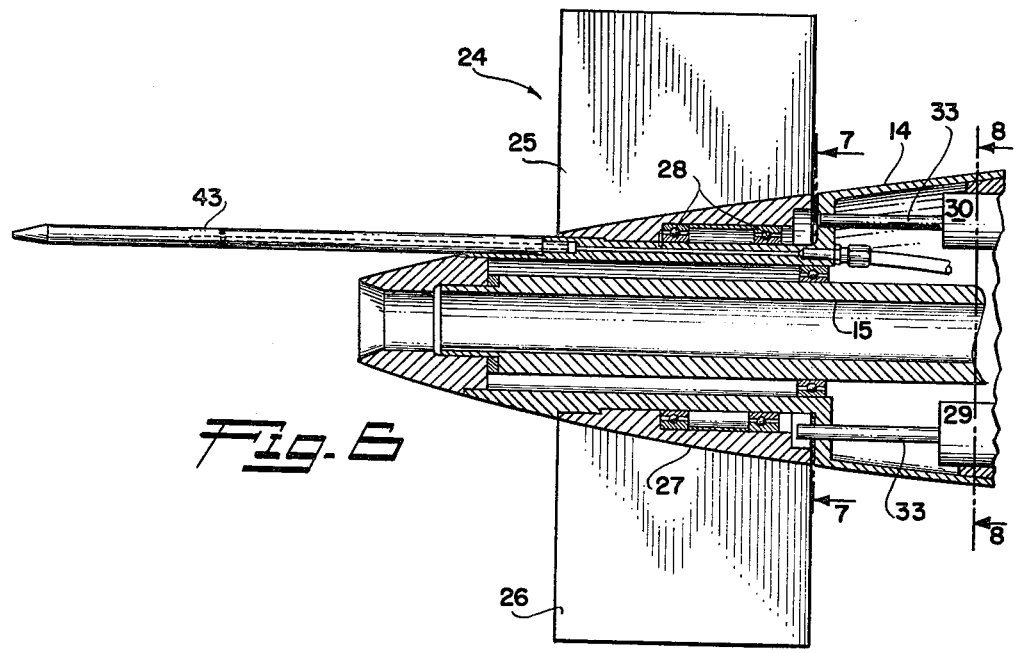
INVENTOR.
WERNER E. HERRMANN
BY
George C. Sullivan
Agent June 2, 1964      W. E. HERRMANN      3,135,484
CONTROL SYSTEM FOR ANNULAR WING AIRCRAFT
Filed Nov. 18, 1959      3 Sheets-Sheet 3

*INVENTOR.*
WERNER E. HERRMANN
BY
*George C. Sullivan*
Agent

United States Patent Office 3,135,484
Patented June 2, 1964

3,135,484
CONTROL SYSTEM FOR ANNULAR WING AIRCRAFT
Werner E. Herrmann, Northridge, Calif., assignor to Lockheed Aircraft Corporation, Burbank, Calif.
Filed Nov. 18, 1959, Ser. No. 853,866
4 Claims. (Cl. 244—76)

The present invention relates to an aircraft, more particularly to an aircraft utilizing a spinning annular wing for purposes of lift and stability. Even more particularly, it relates to a control system for an annular wing aircraft which utilizes the effect of precession of the spinning wing to alter its attitude and heading.

The simplicity and stability of the spinning annular wing aircraft is known to be old in the art as is evidenced by my German Patent Number 726,969 dated September 17, 1942. An annular wing airframe stays at a constant attitude in space and follows a straight line flight depending on its release attitude. For short range flights, it is generally not necessary to correct for deviations from the scheduled flight path. For longer range flights, however, where deviations from scheduled flight path may result in large errors from the destination of the flight, some control means are necessary to correct the aircraft back to the original flight path. Some means are also necessary where it is desired to intentionally change the flight path. To date, efforts in this direction have involved the conventional aircraft control systems using a gyro as a reference, much like a conventional autopilot. However, the complicated systems which center around a reference gyro reduce the advantages of the spinning airframe for stability and simplicity.

It is therefore an important object of the present invention to provide an annular wing aircraft and a control system for said annular wing aircraft.

It is further an object of this invention to provide a spinning annular wing aircraft which utilizes the effect of precession of the spinning annular wing for attitude control by applying a moment to the spin axis to control attitude and course.

It is further an object of this invention to provide an annular wing aircraft control system which utilizes a simplified vertical reference.

FIG. 1 shows a general form of the original annular wing as originally conceived by me in German Patent 726,969.

FIG. 1a is a frontal view of the annular wing of FIG. 1.

FIG. 2 shows the aircraft according to the present invention with the front end toward the left.

FIG. 3 is a cross section view taken on lines 3—3 of FIG. 2.

FIG. 4 is a cross section view taken on lines 4—4 of FIG. 2.

FIG. 5 is a view of one form of the control at the nose of the aircraft taken on lines 5—5 of FIG. 2.

FIG. 6 is a view of the control means taken on lines 6—6 of FIG. 5.

Figure 7:
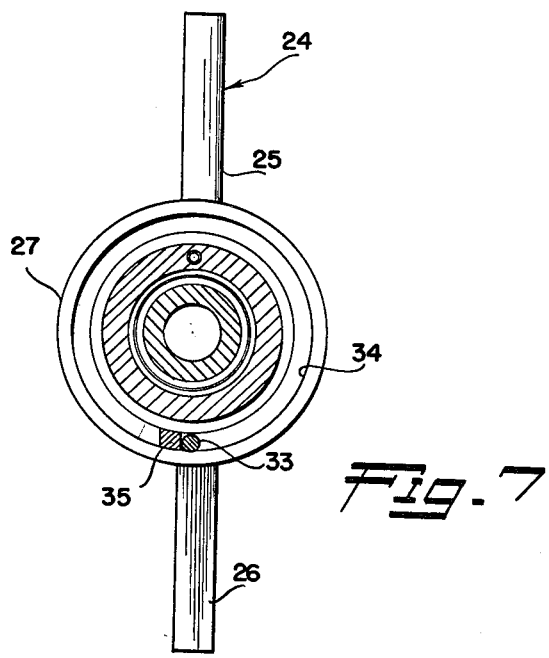
FIG. 7 is a view taken on lines 7—7 of FIG. 6 showing the control vanes stopped in the vertical position.

The spinning annular wing combines lift with inherent stability in a very simple airframe. The upper and lower sections of the rotating annular wing provide the necessary lift and its spinning with the central body stabilizes the airframe by the gyroscopic effect.

The aerodynamic characteristics of the annular wing configurations are such that the shift of the center of pressure is very small at varying angles of attack and at changing speed. The center of gravity is at the same or very close to the location of the center pressure, thus obtaining neutral aerodynamic stability. To keep the precessing of the rotating configuration small, the rotating part is designed for maximum polar moment of inertia and for a high spin rate. Thus, the airframe stays at a constant attitude in space and follows a straight line flight path depending on its release attitude.

To provide attitude and directional control, the present invention utilizes the effect of precession of the rotating annular wing to control pitch attitude and course by applying a moment to the spin axis. The moment that is applied is in a plane 90 degrees to the desired precession plane. To obtain precession in a pitch plane, a lateral moment must be applied. This moment at the spin axis can be caused by a thrust vector or aerodynamic control surface in front or behind the center of gravity of the aircraft. To control the spinning annular wing in the ground-fixed coordinate system, that is, attitude and course, the control moment applied to the spin axis has to be referenced to a plane of the ground-fixed coordinate system. The usual way is to use a gyroscope as a reference as in the conventional autopilot. However, use of such a complicated system would jeopardize the advantages of the spinning annular wing configuration. The present invention retains the advantages of simplicity of the spinning annular wing and utilizes the gyroscopic effect to control its attitude and course.

FIGS. 1 and 1a show an early form of the spinning annular wing as disclosed in my German Patent Number 726,969. The wing 2 is rigidly fixed to the longitudinal body 1 by canted vanes 3. When released at high speed, the vanes 3 will cause and maintain rotation of the wing 2 and body 1, resulting in gyroscopic stability. The simplicity of the annular wing configuration is apparent.

FIG. 2 shows the general arrangement of the annular wing aircraft 10 according to the present invention. The annular wing 11 is fixed to the longitudinal main body 12 by the canted vanes 13 so that they will rotate together. Body 12 is shown with rocket propulsion means 18. The front body 14, hereafter called the pendulum body, is rotatably mounted on shaft 15 which is fixed to the front of the main body 12 at its axis. Low friction bearings 16 on each end of shaft 15 allow for free rotation of the shaft within the body 14. The body 14 is retained in its stationary position with respect to the plane of earth's gravity by the pendulum weight 17 which places the center of gravity of body 14 below its axis defined by shaft 15, as can clearly be seen in FIG. 3. Under normal flight conditions, straight and level with no turn, there is no lateral acceleration and the pendulum body will adjust itself to the direction of the earth's gravity or vertically. The pendulum body is thus oriented to the horizon.

In a turn, however, the pendulum body will tend to erect itself to the resultant of the normal acceleration and that of the lateral acceleration, thus, it would give an erroneous reference. To overcome this difficulty, fin 20 is extended by solenoid 21 from its retracted position in compartment 23 on the lower side of body 14 into the airstream during turns. By constructing fin 20 so that its lateral coefficient of lift (within certain limits to be later described) times its area, times the distance (X2) of its center of pressure 24 (when extended) from the axis of rotation defined by shaft 15 is equal to the weight of pendulum 17 times the distance (X1) of its center of gravity from shaft 15, it can be seen that the two moments ($M_a$ and $M_c$) will cancel each other and the pendulum body 14 will remain vertical during turns.

In order that the aerodynamic surfaces defined by wing 11 and fin 20 will not cause unwanted skewing effect during lateral acceleration, the fin is designed to have the same lateral coefficient of lift slope as that of the annular wing.

To utilize the effect of precession of the spinning annular wing to control attitude and course of the annular wing aircraft herein disclosed, a moment is applied at one end of the spin axis of the aircraft at 90 degrees to the desired change of either attitude or course. In FIGS. 2 and 6, this is shown as control surface 24 fixed to cone 27 which rotates about body 14 on bearings 28. As can be seen from FIG. 5, control surface 24 has a fixed incident angle with respect to the longitudinal axis of the aircraft. In order that the control surface weight be balanced with respect to the longitudinal central axis of the aircraft, two vanes 25, 26 are shown on either side of the central axis. One vane has a slightly higher angle of incidence or small difference in area to the longitudinal axis than the other. The small difference in area or incidence angle of the control surface 24 to the longitudinal axis of the aircraft will cause slow rotation during flight if not locked. The sum of the lift forces of vane 25 and vane 26 when locked or stopped in relation to body 14 will cause a force in a direction normal to the plane in which the control surface 24 lies when stopped in flight. Thus, by stopping the rotation of the control surface in a vertical plane, a normal force will be created against the nose of the craft. This will cause the precession effect of the spinning annular wing 11 and the main body 12 to cause change in pitch attitude. Stopping of the control surface 26 in a horizontal plane will cause the nose of the aircraft to move right or left due to the precession effect of the spinning annular wing 11 and the main body 12. Release of the control surface 24 so that it will continue its rotation will stop this angular movement of the central or spin axis of the aircraft. Thus, it can be seen that simple control resides in merely stopping the rotation of control surface 24 in the proper plane to utilize precession effect to precess the aircraft back to corrected path.

Figure 8:
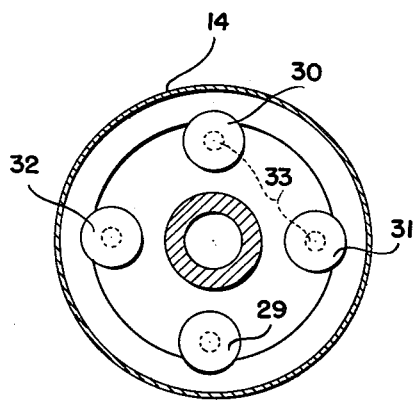
FIG. 8 is a view taken on lines 8—8 of FIG. 6 showing the means by which the control vane is stopped from rotation.

The means by which the control surface 24 is stopped in flight is shown in FIGS. 6, 7 and 8. The cone 27 rotates around the body 14 on bearings 28. In the body 14 are four solenoids 29, 30, 31 and 32, each of which has a rod 33 which will be extended to the left as seen in FIG. 4 when the particular solenoid is energized. The rod 33 will move into annular groove 34 of the cone 27, stopping the movement of the control surface 24 and cone 27 when the rod 33 comes in contact with stop 35. The control surface 24 may be stopped in any one of four positions on its axis by energizing the proper solenoid. Thus, a force normal to the end of the central axis of the aircraft may be applied in four different directions.

Control signals may come from sensing devices aboard the aircraft or from ground guidance systems. FIG. 2 shows altitude deviation sensor 42 which may utilize signals from static pressure probe 43 and directional sensor 44 which may take its signals from a celestial body. Desired altitude and course is preset into sensors 42 and 44. Altitude deviation will cause sensor 42 to actuate solenoid 29 or solenoid 30 to stop the control surface 24 in the proper vertical position to return the aircraft to its proper altitude utilizing the gyroscopic precession effect of the aircraft. Deviations from course will cause sensor 44 to actuate solenoid 21 and either of solenoids 31 or 32 to cause the precession effect to return to the preset heading. It will be noted that the airframe stabilized by this control system will show no pitch or yaw oscillation following a command given or taken out as usually is experienced on conventional wing configurations. The spinning airframe will precess at a constant rate as long as a constant control moment is applied and will stop instantaneously when the moment is removed.

Where only gradual turns are required, the fin 20 may be eliminated. The pendulum body 14 will tend to erect itself slightly in turns which will give the control surface 24 a small down tilt in the direction of the turn. This will cause the aircraft to decrease its pitch attitude as it turns, resulting in some loss in altitude. The loss of altitude will be detected by the sensor 42 and the control surface stopped in the vertical plane when the turn is complete to cause precession to increase pitch until the aircraft is returned to desired altitude.

A spinning annular wing aircraft has been disclosed and a control system which utilizes the effect of the precession effect of the spinning annular wing thereby retaining the advantages of simplicity of this type of aircraft at the same time requiring positive control.

It is to be understood that certain alterations, modifications and substitutions may be made to the instant disclosure without departing from the spirit and scope of the invention as defined in the appended claims.

What is claimed is:

1. An aircraft having a central fore and aft axis and a main body, an annular wing having its axis coincidental with said central axis, canted vanes extending radially from said main body to said annular wing and fixed to said main body and said annular wing to cause rotation around said central axis when influenced by relatively moving air parallel to said central axis, a shaft extending from and fixed to said main body on said central axis, a pendulum body mounted for free rotation on said shaft and having its center of gravity below said shaft, a vertical fin on said pendulum body below said center of gravity, a canted control surface mounted radially for free rotation on said pendulum body so that relatively moving air parallel to the central axis will cause said canted control surface to rotate about said pendulum body, means to preselect a course and altitude, means to detect deviations from said preselected course and altitude to stop said canted control surface in the plane of movement required of said central axis to return said aircraft to said preselected course and altitude and means for extending said fin into the relatively moving air.

2. An aircraft having a central fore and aft axis and a main body, an annular wing having its axis coincidental with said central axis, canted vanes extending radially from said main body to said annular wing and fixed to said main body and said annular wing to cause rotation around said central axis when influenced by relatively moving air parallel to said central axis, a shaft extending from and fixed to said main body on said central axis, a pendulum body mounted for free rotation on said shaft having its center of gravity below said shaft, a vertical fin on said pendulum body below said center of gravity, canted control surface means extending radially from said pendulum body and mounted for free rotation thereto so that relatively moving air parallel to the central axis of said aircraft will cause rotation of said canted control surface, means to stop said canted control surface in a vertical plane for changes in pitch attitude and means to stop said canted control surface in the horizontal plane for changes in direction so as to utilize the gyroscopic precession effect of said rotating main body and annular wing.

3. An aircraft having a central fore and aft axis and a main body, an annular wing having its axis coincidental with said central axis, canted vanes extending radially from said main body to said annular wing and fixed to said main body and said annular wing to cause rotation about said central axis when influenced by relatively moving air parallel to said central axis, a shaft extending from and fixed to said main body on said central axis, a pendulum body mounted for free rotation on said shaft having its center of gravity below said shaft, a compartment in said pendulum body having an opening to the underside of said pendulum body, a vertical fin in said compartment, canted control surfaces mounted for free rotation on said pendulum body perpendicular to said central axis so that relatively moving air will cause rotation of said control surfaces, one of said control surfaces being canted a larger amount than other said control surfaces so that said one of said control surfaces will have a greater lateral lift than other of said control surfaces, means to preset a desired altitude reference, means responsive to deviations in said altitude reference to stop said control surfaces in a vertical plane, means to preset a desired course reference, means responsive to deviations from said course reference to stop said control surfaces in a horizontal plane and move said vertical fin out of said compartment so as to utilize the gyroscopic precession effect of said rotating main body and annular wing to alter altitude and course, and to maintain said pendulum body vertically during turns, and propulsion means for said aircraft.

4. An aircraft having a central fore and aft axis and a main body, an annular wing having its axis coincidental with said central axis, canted vanes extending radially from said main body to said annular wing and fixed to said main body in said annular wing to cause rotation about said central axis when influenced by relatively moving air parallel to said central axis, a shaft extending from and fixed to said main body on said central axis, a pendulum body mounted for free rotation on said shaft having its center of gravity below said shaft, a compartment in said pendulum body having an opening to the underside of said pendulum body, a vertical fin in said compartment, aerodynamic means mounted for free rotation on said pendulum body, said aerodynamic means having surface means which will cause a force to be exerted on said aerodynamic means tangentially to said central axis in response to relatively moving air parallel to said central axis to cause said aerodynamic means to rotate about said pendulum body, means to preset a desired altitude reference, means responsive to deviations in said altitude reference to stop said aerodynamic means in a plane so that horizontal tangential force is applied to said aerodynamic means, means to preset a desired course reference, means responsive to deviations from said course reference to stop said aerodynamic means in a plane to exert a vertical tangential force and to move said vertical fin out of said compartment so as to utilize the gyroscopic precession effect of said rotating main body and annular wing to alter altitude and course and to maintain said pendulum body vertically during turns, and propulsion means for said aircraft.

References Cited in the file of this patent

UNITED STATES PATENTS

| | | |
|---|---|---|
| 2,421,085 | Rylsky | May 27, 1947 |
| 2,874,920 | Mallinckrodt | Feb. 24, 1959 |

FOREIGN PATENTS

| | | |
|---|---|---|
| 726,969 | Germany | Sept. 17, 1942 |